United States Patent [19]

Kerkman et al.

[11] Patent Number: 5,032,771
[45] Date of Patent: Jul. 16, 1991

[54] SLIP CONTROL BASED ON SENSING VOLTAGE FED TO AN INDUCTION MOTOR

[75] Inventors: Russel J. Kerkman, Milwaukee; Timothy M. Rowan, Wauwatosa, both of Wis.

[73] Assignee: Allen-Bradley Company, Inc., Milwaukee, Wis.

[21] Appl. No.: 565,288

[22] Filed: Aug. 9, 1990

[51] Int. Cl.$^5$ ................................................ H02P 7/00
[52] U.S. Cl. ...................................... 318/52; 318/805; 318/807
[58] Field of Search ................................ 318/798–812, 318/52, 432, 816; 382/801, 802, 804, 806; 303/94, 95, 100, 103, 112

[56] References Cited

U.S. PATENT DOCUMENTS

| 4,001,660 | 1/1977 | Lipo | 318/802 |
|---|---|---|---|
| 4,041,361 | 8/1977 | Cornell | 318/802 |
| 4,243,927 | 1/1981 | D'Atre | 318/803 |
| 4,361,794 | 11/1982 | Kawada et al. | 318/800 |
| 4,392,100 | 7/1983 | Stanton et al. | 318/803 |
| 4,437,051 | 3/1984 | Muto et al. | 318/803 |
| 4,456,868 | 6/1984 | Yamamura et al. | 318/800 |
| 4,459,534 | 7/1984 | Nagase et al. | 318/808 |
| 4,503,376 | 3/1986 | Okuyama | 318/802 |
| 4,581,569 | 4/1986 | Fujioka et al. | 318/811 |
| 4,628,475 | 12/1986 | Azusawa et al. | 364/861 |
| 4,677,360 | 6/1987 | Garces | 318/805 X |
| 4,680,695 | 7/1987 | Kerkman et al. | 363/160 |
| 4,724,373 | 2/1988 | Lipo | 318/805 |
| 4,958,117 | 9/1990 | Kerkman et al. | 318/805 |

FOREIGN PATENT DOCUMENTS 2104692 3/1983 United Kingdom .

OTHER PUBLICATIONS

Adjustable Speed AC Drive Systems, Edited by Bimal K. Bose, IEEE Press, pp. 12–15, 1981.
R. D. Lorenz, D. B. Lawson, "A Simplified Approach to Continuous On-Line Tuning of Field Oriented Induction Machines", IEEE-IAS, Conference Record 1988, pp. 444–449.
Seibel, Kerkman, Leggate, "Inverter Control During Overload and Following Power Interruption", IEEE-IAS 1989 Conference Record, Oct. 1-5, 1989.
Kerkman, Rowan, Leggate, "Indirect Field Oriented Control of an Induction Machine in the Field Weakening Region", IEEE-IAS 1989 Conference Record, Oct. 1-5, 1989, pp. 375–383.
Rowan, Kerkman, Leggate, "A Simple On-Line Adaption for Indirect Field Orientation of an Induction Machine", IEEE-IAS, 1989 Conference Record, Oct. 1-5, 1989, pp. 579–587.

Primary Examiner—William M. Shoop, Jr.
Assistant Examiner—A. Jonathan Wysocki
Attorney, Agent, or Firm—Quarles & Brady

[57] ABSTRACT

An electronic motor drive for vector control of an induction motor controls slip and operating frequency in response to changes in stator voltage. The drive includes a torque control loop, a flux control loop and a frequency control loop which includes slip control in response to a voltage difference. In the constant horsepower range, above base speed, slip is controlled in response to an error between an d-axis reference voltage that is sampled at base speed and a d-axis feedback voltage that is sensed when the motor is operating above base speeed. Flux-weakening is provided in response to an error between a q-axis reference voltage that is sensed when the motor is operating at base speed and a q-axis feedback voltage that is sensed when the motor is operating above speed.

9 Claims, 6 Drawing Sheets

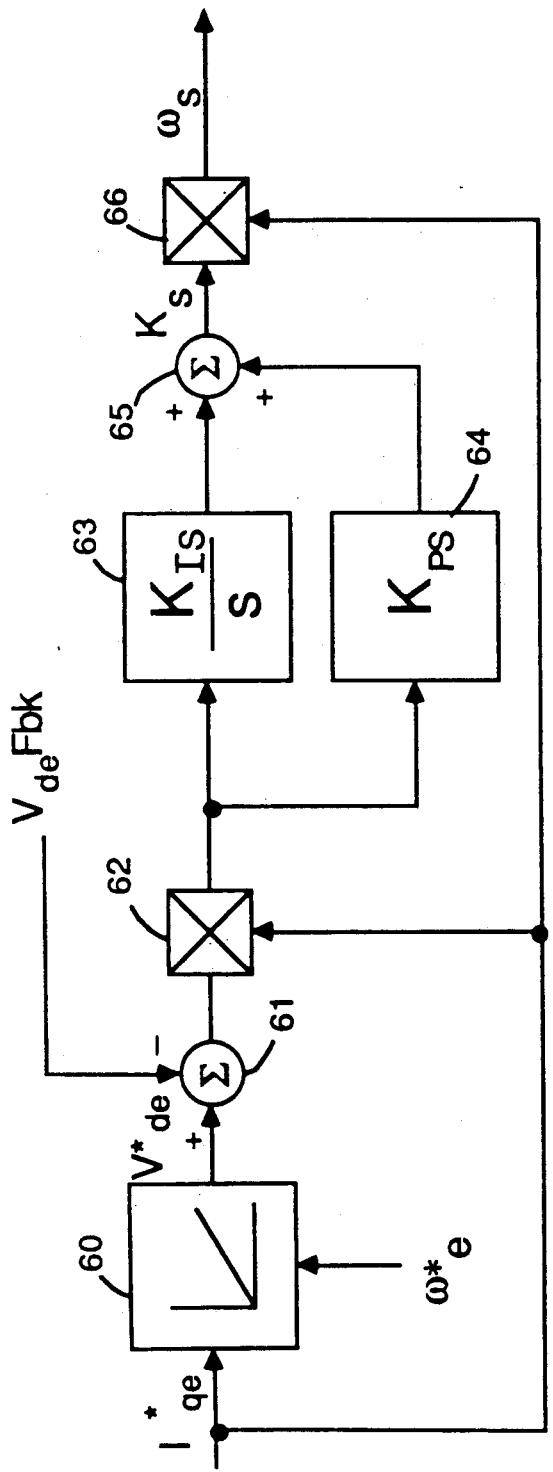
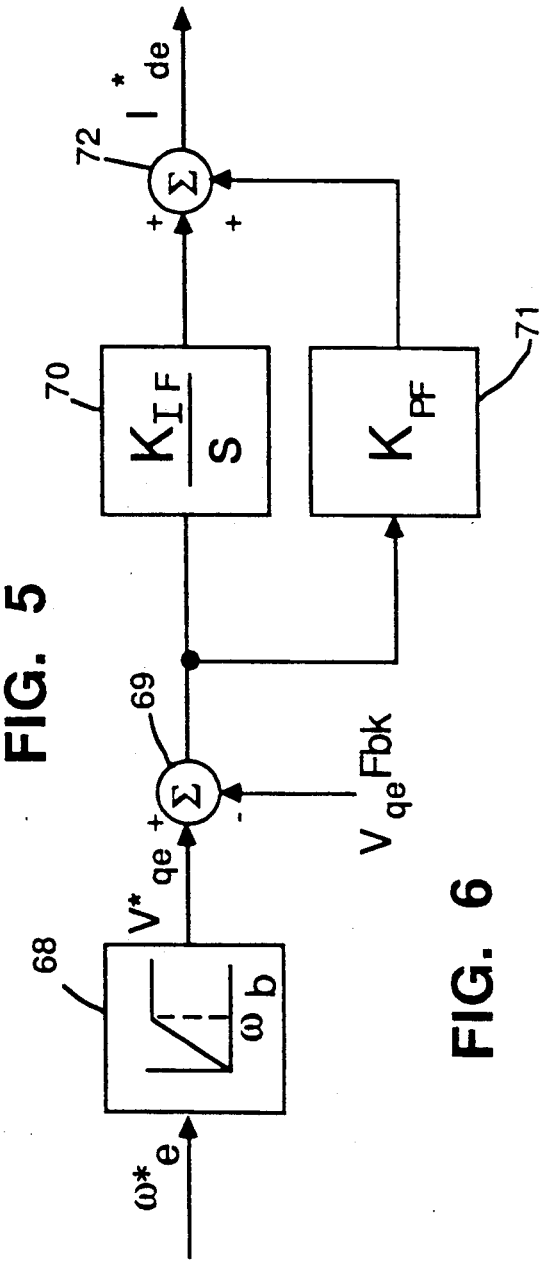
FIG. 5
FIG. 6

SLIP CONTROL BASED ON SENSING VOLTAGE FED TO AN INDUCTION MOTOR

BACKGROUND OF THE INVENTION

1. Field of the Invention

The field of the invention is high performance, electronic, motor drives for variable speed control of AC induction motors, and more particularly, motor drives using vector control techniques and speed feedback.

2. Description of the Background Art

Vector control or field-oriented control is one technique used in motor drives for controlling the speed and torque of AC motors. With this technique, stator current is resolved into a torque-producing or q-axis component of current, $I_q$, and a flux-producing or d-axis component of current, $I_d$, where the q-axis leads the d-axis by 90° in phase angle.

To provide a high performance drive, there are several other requirements. A speed sensor is required, to obtain speed feedback from the rotor, which is used in controlling the torque, frequency and slip at which the motor is operated. Another requirement of prior drives has been a knowledge of motor parameters such as inductance (L) and resistance (R) of the rotor and stator. In prior systems, the set up of a drive involved adjustments based on these parameters for the particular motor being controlled.

While other motor control techniques are known to reduce the number of motor parameters which must be evaluated, they have not altogether eliminated this requirement in a high performance drive. The motor parameters must be obtained from the manufacturer of the motor or determined through rigorous testing of the motor.

Besides making an initial determination for slip, based on motor parameters, another requirement has been on-line adaptation to dynamic changes in motor parameters during operation of the motor. One example of a dynamic change occurs when the rotor resistance ($R_r$) changes with the heating of the motor.

Additional control strategies are required when operating in the constant horsepower region, above base speed, where it is necessary to (1) weaken flux to achieve higher speeds and (2) maintain the vector control relationship of the d-axis and q-axis components of flux produced in the motor.

SUMMARY OF THE INVENTION

The invention relates to a motor drive which controls slip of an induction motor without prior knowledge of machine parameters. This allows the drive to be used with a variety of motors without the set up for machine parameters that would otherwise be required.

In a broad aspect of the invention, where slip is controlled as a dynamic and non-linear function of motor operation, a slip frequency command is modified in response to feedback representative of stator voltage, so that both stator voltage and stator current are sensed by the motor control.

In a more specific aspect of the invention, a slip gain multiplier, $K_s$, is regulated in response to a voltage error determined as a difference between the command for the d-axis component of stator voltage ($V^*_d$) and feedback representative of the d-axis component of actual stator voltage ($V_d$). The error in the d-axis voltage is an indicator of the loss of field orientation, and may be exhibited in torque oscillations as the motor is operated above base speed. These oscillations result from an indication of undesirable coupling of the d-axis rotor flux and q-axis torque commands. By modifying slip in response to such errors, field orientation or vector control can be maintained. This method is applied in the constant horsepower range, at speeds above base speed, by sensing the d-axis component of actual stator voltage ($V_d$) at base speed, and using this voltage as the command ($V^*_d$) for operation of the motor above base speed. Any error in the d-axis voltage is then used to modify the slip gain ($K_s$) until the error is nulled.

In another more specific aspect of the invention, flux-weakening can be achieved in the constant horsepower range in an analogous fashion, by measuring the q-axis component of actual stator voltage ($V_q$) at base speed, and using this voltage as the command ($V_q^*$) for operation of the motor above base speed. Flux is weakened by controlling a command for the d-axis stator current ($I^*_d$) in response to an error between the command ($V^*_q$) for operation of the motor above base speed and the voltage feedback ($V_q$) sensed for the q-axis component above base speed.

Other objects and advantages, besides those discussed above, shall be apparent to those familiar with the art from the description of the preferred embodiments which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

BRIEF DESCRIPTION OF THE DRAWINGS

FIGS. 5 and 6 are more detailed block diagrams for elements in FIG. 4; and

DETAILED DESCRIPTION OF THE PREFERRED EMBODIMENTS

Figure 1:
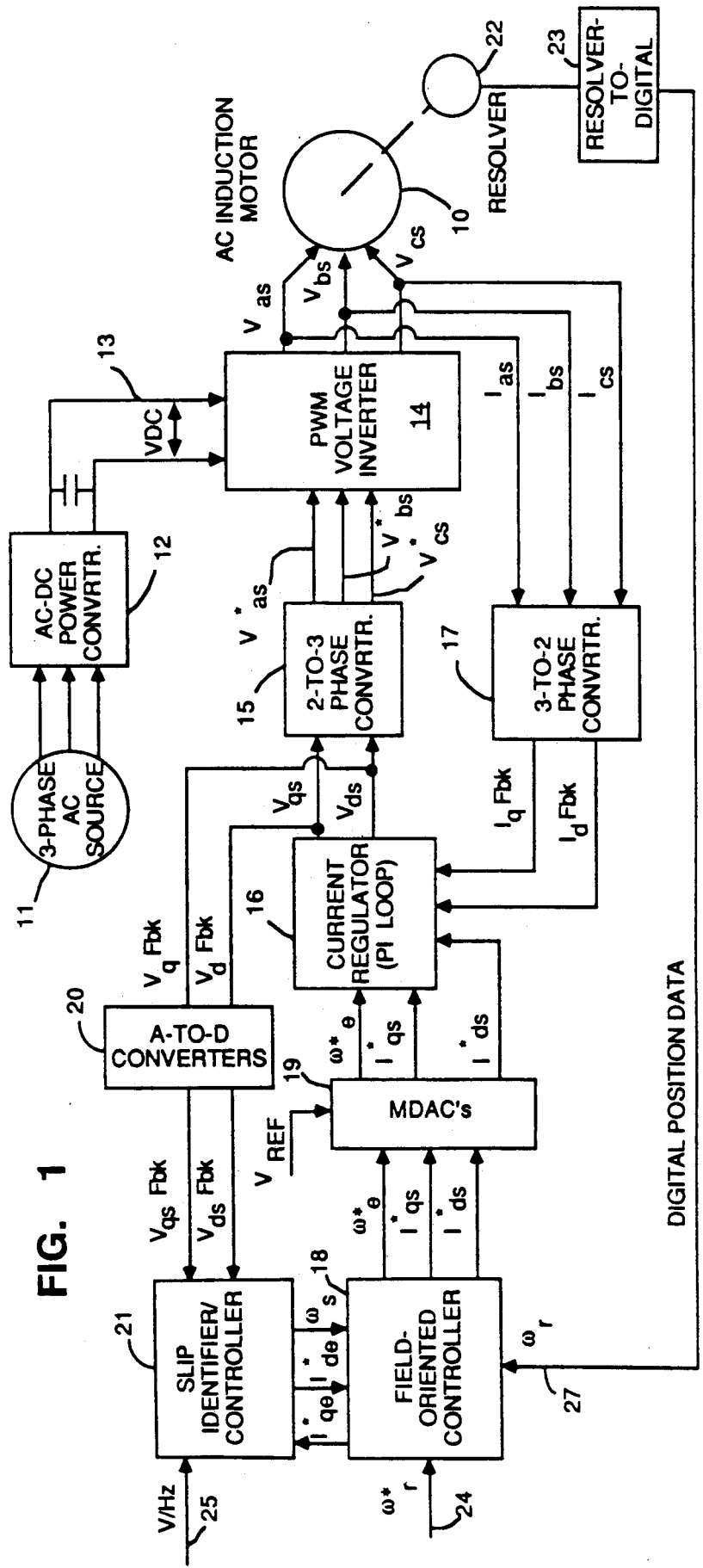
FIG. 1 is a block diagram of a motor drive for carrying out the invention.

FIG. 1 illustrates a current-regulated pulse width modulation (CRPWM) motor control for an AC induction motor 10. The motor control (also called a "drive") includes a power section that receives power at a line frequency of 60 Hz from a 3-phase AC power source 11. The three phases of the power source are connected to an AC-DC power converter 12 in the power section of the drive. The AC-DC power converter 12 rectifies the alternating current signals from the AC source 11 to produce a DC voltage (VDC) on a DC bus 13 that connects to power inputs on the pulse width modulation (PWM) voltage inverter 14, which completes the power section of the drive. The AC source 11, the AC-DC power converter 12, and DC bus 13 provide a DC source for generating a DC voltage of constant magnitude. The PWM inverter 14 includes a group of switching elements which are turned on and off to convert this DC voltage to pulses of constant magnitude.

The pulse train pattern from a PWM inverter is characterized by a first set of positive-going pulses of constant magnitude but of varying pulse width followed by a second set of negative-going pulses of constant magnitude and of varying pulse width. The RMS value of this pulse train pattern approximates one cycle of a sinusoidal AC waveform. The pattern is repeated to generate additional cycles of the AC waveform.

To control the frequency and magnitude of the resultant AC power signals to the motor, AC inverter control signals are applied to the PWM inverter. The PWM voltage inverter 14 receives three balanced AC inverter control signals, $V^*_{as}$, $V^*_{bs}$ and $V^*_{cs}$ which vary in phase by 120°, and the magnitude and the frequency of these signals determines the pulse widths and the number of the pulses in pulse trains $V_{as}$, $V_{bs}$ and $V_{cs}$ which are applied to the terminals of the motor. The asterisk in the first set of signals denotes a "command" signal. The "s" subscript in both sets of signals denotes that these signals are referred to the stationary reference frame. The voltages $V_{as}$, $V_{bs}$ and $V_{cs}$ are phase voltage signals incorporated in the line-to-line voltages observed across the stator terminals.

The AC inverter control signals, $V^*_{as}$, $V^*_{bs}$ and $V^*_{cs}$ result from a 2-phase to 3-phase conversion which is accomplished with a 2-to-3 phase converter 15. The input signals $V_{qs}$ and $V_{ds}$ are sinusoidal AC voltage command signals having a control signal magnitude and a frequency. These signals are related to a stationary d-q reference frame in which torque-controlling electrical parameters are related to a q-axis and flux-controlling electrical parameters are related to a d-axis. The q-axis leads the d-axis by 90° in phase difference.

Phase currents $I_{as}$, $I_{bs}$ and $I_{cs}$ flowing through the stator terminals are sensed, using current sensing devices (not shown) of a type known in the art. These signals are fed back to a 3-to-2 phase converter 17 for converting these signals to feedback signals $I_q$ Fbk and $I_d$ Fbk related to the stationary d-q frame of reference.

The AC voltage control signals $V_{qs}$ and $V_{ds}$ are output signals from a synchronous current regulator 16. The details of this circuit 16 have been previously shown and described in Kerkman et al., U.S. Pat. No. 4,680,695 issued July 14, 1987. The synchronous current regulator 16 includes a proportional-integral loop (PI loop) with summing inputs. At one summing input, an AC current command signal for the q-axis, $I^*_{qs}$, is algebraically summed with an $I_q$ Fbk signal to provide a current error for the q-axis. At a second summing input, an AC current command signal for the d-axis, $I^*_{ds}$, is algebraically summed with an $I_d$ Fbk signal to provide a current error for the d-axis. The electrical operating frequency in radians ($\omega^*_e$) is also an input signal to both the q-axis and d-axis branches of the circuit. With these input signals, the synchronous current regulator 16 controls the AC voltage command signals $V_{qs}$ and $V_{ds}$ at its outputs in response to current error, and further, it maintains the vector orientation of the output signals to the d-axis and the q-axis.

Voltage changes at the stator terminals cause a change in voltages $V_{qs}$ and $V_{ds}$ at the outputs of the synchronous current regulator 16 as disclosed in a copending application of Rowan et al. Ser. No. 504,110, filed Apr. 3, 1990, which is assigned to the assignee of the present invention. A change in voltage at the motor terminals is reflected back to the outputs of the current regulator 16. Sensing voltages $V_{qs}$ and $V_{ds}$ instead of stator terminal voltages $V_{as}$, $V_{bs}$ and $V_{cs}$ provides signals with less harmonic content and provides control-level signals as opposed to motor power-level signals. The voltage feedback quantities $V_q$ Fbk and $V_d$ Fbk are converted from analog signals to digital data ($V_{qs}$ Fbk, $V_{ds}$ Fbk) by A-to-D converters 20.

Thus far, the description has related to elements which known in the art. The invention involves the organization of two controller elements, a field-oriented controller 18 and a slip identifier/controller 21. These two controllers can be embodied in a microelectronic processor operating in response to a stored program. A preferred form of this microelectronic processor is the Model 8096 offered by Intel Corporation of Santa Clara, Calif. The A-to-D converters 20 are incorporated in this circuit.

The basic functions of the field-oriented controller 18 are to respond to the speed feedback $\omega_r$ to control an AC torque command $I^*_{qs}$ and also to provide the AC flux control command $I^*_{ds}$ and the stator operating frequency command $\omega^*_e$ to the current regulator 16.

The field-oriented controller 18 receives speed feedback $\omega_r$ from the rotor in the form of digitized position data. A resolver 22 is coupled to the rotor of the motor 10. As the rotor rotates, signals are generated from the resolver 22 to a resolver-to-digital conversion circuit 23 which transmits the digital position data to the field-oriented controller 18. The field-oriented controller 18 receives a velocity command $\omega^*_r$ at a user input 25.

The field-oriented controller 18 generates digital values for $I^*_{qs}$ or $I^*_{ds}$ which are instantaneous values of AC signals in the form of $I^* \cos \theta_e$ and $-I^* \sin \theta_e$, respectively. The series of digital values follows the functions $I^* \cos \omega_e t$ and $-I^* \sin \omega_e t$. These values are inputs to MDAC circuits 19, where the values are multiplied by $V_{REF}$ to arrive at the proper signal level for input to the synchronous current regulator 16. A commercial version of this circuit is the AD 7524 multiplying digital-to-analog converter offered by Analog Devices, Norwood, Mass. The signals resulting from the conversion through MDAC circuits 19 are designated $I^*_{qs}$ and $I^*_{ds}$ and are AC input signals to the synchronous current regulator 16.

The slip identifier/controller 21 generates a DC flux current command $I^*_{de}$ in the synchronous d-q frame of reference and also generates a slip angular frequency command $\omega_s$. These take the form of data which are inputs to the field-oriented controller 18. The slip identifier/controller 21 generates the slip angular frequency command $\omega_s$ as an output of a control loop which receives voltage feedback quantities $V_q$ Fbk and $V_d$ Fbk. The voltage feedback is compared to one or more voltage commands for the motor to determine a voltage difference, and it is this voltage difference that controls the slip angular frequency command $\omega_s$.

In a first embodiment, which is useful at speeds below base speed, a voltage magnitude controller is provided in which a voltage command V* is a single command of a certain magnitude, and in which the voltage feedback is resolved into a single value, $V_{MAG}$, of a certain magnitude for comparison with the voltage command, V*.

In a second embodiment, which is advantageous at speeds above base speed, the voltage commands are resolved into q-axis and d-axis components for comparison with the voltage feedback for the respective axes. In the second embodiment, the voltage controller for the d-axis controls slip by controlling $\omega_s$, and the voltage controller for the q-axis controls the flux current command $I^*_{de}$.

Figure 7:
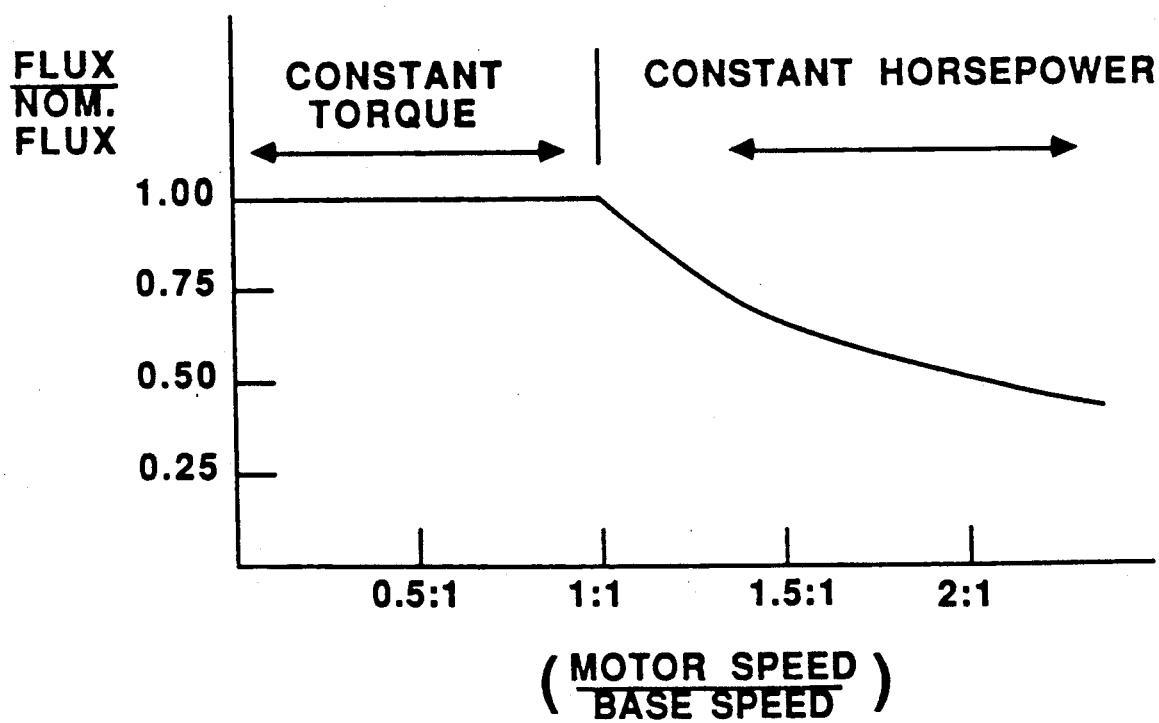
FIG. 7 is a graph showing operation of a motor in the constant torque and constant horsepower regions.

FIG. 7 is a graph showing the two regions of operation of a typical AC induction motor. The two regions are divided by the speed threshold known as "base speed".

With the exception of startup operation, constant torque and steady-state nominal flux are produced when the motor is operated between zero speed and base speed. Horsepower is the product of torque and speed. Horsepower is increased until it reaches a rated horsepower at base speed. Thereafter, further increases in speed require that flux be reduced or weakened, and horsepower is not increased. The range of operation above base speed is referred to as the constant horsepower range of operation and may extend up to a speed four times higher than base speed. In the example in FIG. 7, flux at two times base speed is reduced to about 50% of rated or nominal flux for the motor.

Figure 2:
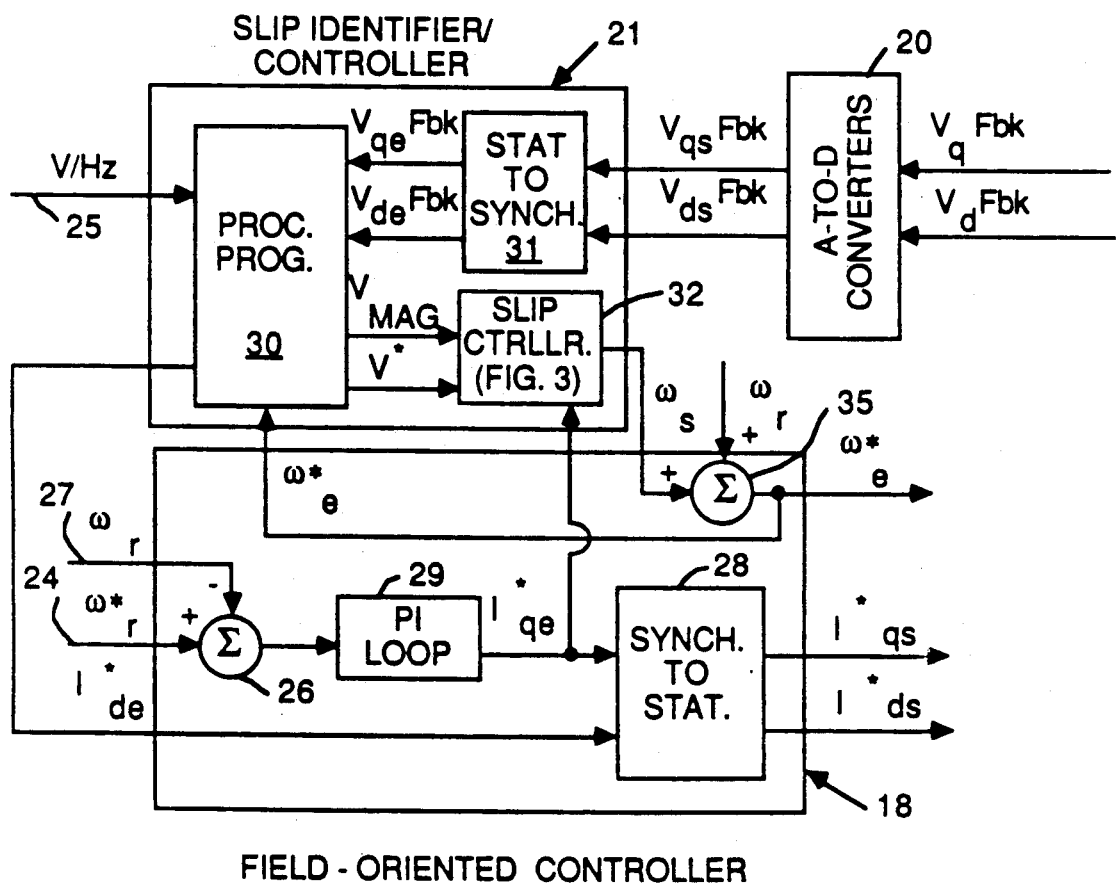
FIG. 2 is a more detailed block diagram of a portion of FIG. 1 for a first embodiment.

Referring to FIG. 2, the slip identifier/controller 21 and the field-oriented controller 18 for the first embodiment are shown. The microprocessor executes a program 30 stored in nonvolatile memory to control slip. In executing this program the microprocessor utilizes a random access memory (RAM) (not shown) to store data and temporary results. The voltage feedback quantities $V_q$ Fbk and $V_d$ Fbk are transformed from the stationary (AC) reference frame to $V_{qe}$ Fbk and $V_{de}$ Fbk quantities in the synchronous (DC) reference frame by executing a stationary-to-synchronous transformation of a type known in the art and represented by block 31. These voltage feedback quantities $V_{qe}$ Fbk and $V_{de}$ Fbk become inputs to routines in a main portion 30 of a microelectronic processing program.

The voltage command $V^*$ may be the nominal or nameplate voltage for the motor, or it may be a function of the V/Hz input multiplied by an operating frequency command $\omega^*_e$. For the second alternative, the microprocessor calculates the motor voltage command value $V^*$ in response to a voltage/hertz ratio according to the following equation:

$$V^* = \omega^*_e(t)/2\pi \times (V/Hz) \quad (1)$$

where (V/Hz) is the volts/hertz ratio.

The voltage/hertz ratio is set to a predetermined ratio by connecting a jumper wire on an input interface 25 represented in FIG. 2, so that an input signal is read by the microelectronic processor that acts as the slip identifier/controller 21.

Figure 3:
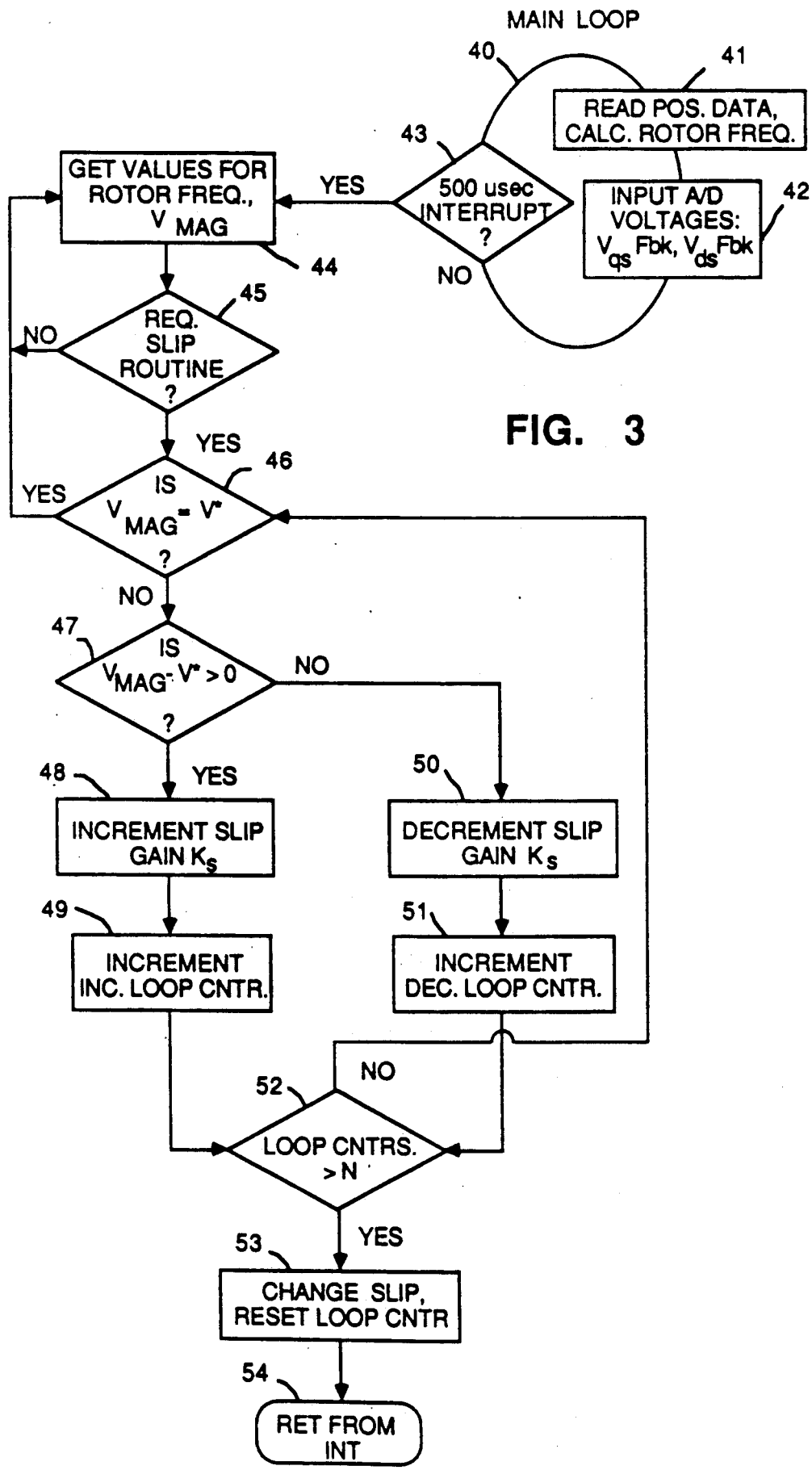
FIG. 3 is a flow chart of a subroutine represented in FIG. 2.

The voltage command $V^*$ and the voltage feedback magnitude $V_{MAG}$ are inputs to a slip controller portion of the program represented by block 32 in FIG. 2 and shown in more detail in FIG. 3.

Referring to FIG. 3, a main loop 40 in the CPU program 30 includes a block of instructions 42 to read the voltage feedback quantities $V_{qs}$ Fbk and $V_{ds}$ Fbk from the A-to-D converters 20 and to calculate $V_{MAG}$. The calculation involves squaring the magnitudes of the feedback quantities, summing the squares and taking the square root of this sum.

As represented by the "time out" decision block 43 in FIG. 3, an interrupt routine is executed every 500 microseconds to see if the slip command ($\omega_s$) needs adjustment. The program then branches to an interrupt subroutine starting with process block 44, which represents getting the calculated value for $V_{MAG}$.

Next, as represented by decision block 45, a check is made to see if the slip routine has been requested. If not, the program loops and monitors $V_{MAG}$. Is the answer is "YES", then a check is made, as represented by decision block 46, to see if $V_{MAG} = V^*$. If the answer is "YES", no adjustment in slip is necessary and the microprocessor will loop back to monitor $V_{MAG}$. If $V_{MAG}$ is not equal to $V^*$, then a check is made, as represented by decision block 47, to see if $V_{MAG} > V^*$. If the answer is "YES", then the slip multiplier $K_s$ is incremented, as represented by process block 48, and an "increment slip" counter is incremented by one, as represented by process block 49. Slip is increased to lower the stator terminal voltage and maintain vector control. If the answer is "NO" in block 47, then $V_{MAG} < V^*$, by virtue of the previous check in block 46. The slip multiplier $K_s$ is decremented, as represented by process block 50, and a decrement slip counter is incremented by one, as represented by process block 51. Slip is decreased to raise the stator terminal voltage and maintain vector control.

After one of these two paths is taken, a check is made as represented by decision block 52 to see if the loop counter for either the "increment slip" or "decrement slip" loop has exceeded N counts. This is necessary to be sure that the signals are sampled over some number of electrical cycles or definite time period. Assuming the necessary time has elapsed, the slip multiplier is permanently changed by adding it to the old slip multiplier and dividing by two to average the two values, as represented by process block 53. The loop counters are reset. Then, as represented by return block 54, a return from the interrupt routine is executed.

The slip multiplier $K_s$ is then multiplied by the torque current command $I^*_{qe}$ to generate the slip frequency command $\omega_s$ according to the following relationship:

$$\omega_s = K_s (I^*_{qe}) \quad (2)$$

where Ks is a lumped constant $$= \frac{R_r L_m}{L_r \lambda_{dr}}$$

where $R_r$ is the resistance of the rotor,
where $L_m$ is the magnetizing inductance,
where $L_r$ is the inductance of the rotor, and
where $\gamma_{dr}$ is the rotor d-axis flux.

By adjusting $K_s$ as function of stator voltage changes, the need to measure the above motor parameters is eliminated.

As seen in FIG. 2, the slip frequency command $\omega_s$ from the slip controller 32 is then algebraically summed with the rotor angular frequency feedback $\omega_r$ from input 27 to arrive at the stator operating frequency command $\omega^*_e$, which is then transmitted to an input on the synchronous current regulator 16 in FIG. 1.

The feedback quantity $V_{qe}$ Fbk can be compared to a DC command $V^*_{qe}$ to provide a voltage error to control a DC flux current command $I^*_{de}$. The DC torque current command $I^*_{qe}$ is a result of a conventional speed-torque control loop in which the speed command $\omega^*_r$ at user input 24 is algebraically summed at junction 26 with speed feedback $\omega_r$ at input 27. The difference is an input to a PI control loop algorithm 29. The resulting DC torque command $I^*_{qe}$, which is related to the synchronous d-q reference frame, is then transformed to an AC command $I^*_{qs}$ in the stationary d-q reference frame by performing the transformation represented by process block 28. This transformation is well known in the art and is described in Bose, "Adjustable Speed AC Drive Systems", IEEE Press, 1980, p. 14. It should be noted that all electrical parameters in the present description relate to the stator of the motor unless a rotor parameter is noted.

If the stator angular frequency corresponding to base speed is designated "$\omega_b$", then the voltage magnitude embodiment of FIGS. 2 and 3 is suitable for stator operating frequencies $\omega^*_e < \omega_b$. At frequencies corresponding to rotor speeds above base speed, where $\omega^*_e > \omega_b$, a second embodiment becomes more effective.

Figure 4:
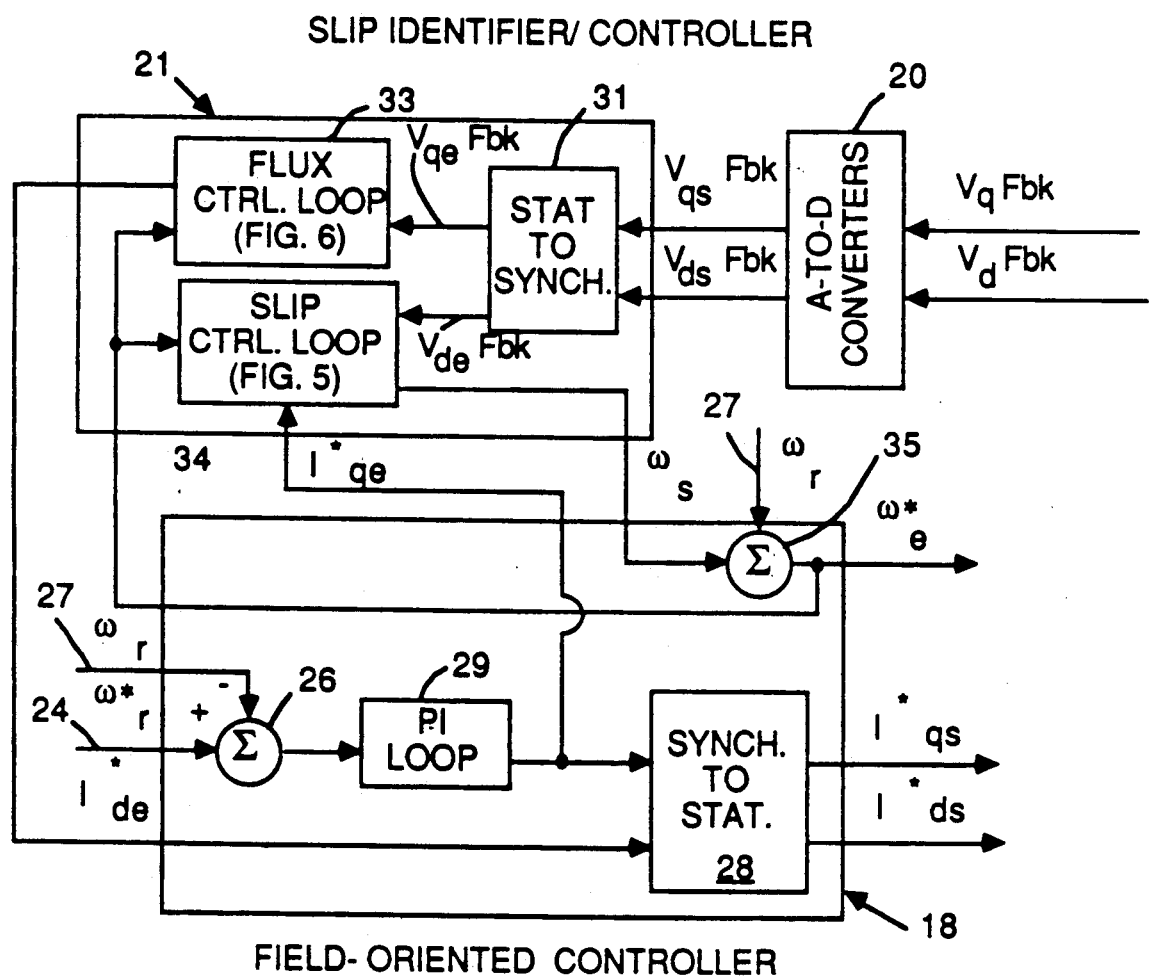
FIG. 4 is a more detailed block diagram of a portion of FIG. 1 for a second embodiment.

The second embodiment is shown in FIGS. 4-6. The digitized feedback values $V_q$ Fbk and $V_d$ Fbk are transformed from the stationary d-q reference frame to the synchronous d-q reference frame through the transformation represented by process block 31. The feedback value $V_{qe}$ Fbk is fed to flux control loop 33 to control a DC flux current command $I^*_{de}$. This command is transformed to a digital AC current command $I^*_{ds}$ for the d-axis in the stationary d-q reference frame by performing the transformation represented by process block 28.

The feedback value $V_{de}$ Fbk is fed to slip control loop 34 to control a stator operating frequency command $\omega_s$. The speed command $\omega^*_r$ is compared to the speed feedback $\omega_r$ and a PI control loop algorithm 29 is applied to the error to control a DC torque current command $I^*_{qe}$. The command $I^*_{qe}$ is an input to the slip control loop circuit 34. $I^*_{qe}$ is also transformed to a digital AC command $I^*_{qs}$ for the q-axis in the stationary d-q reference frame by performing the transformation represented by process block 28.

The digitized vector control commands $I^*_{qs}$ and $I^*_{ds}$ are converted to analog vector control commands by the MDAC's 19 in FIG. 1, as discussed previously.

Referring to FIG. 5, the details of the slip control loop show that the command $I^*_{qe}$ is an input to a function block 60 along with $\omega^*_e$.

This block 60 represents the calculation of a d-axis voltage command $V^*_{de}$ according to the following approximation in which several omitted terms on the right hand side are considered negligible when operating above base speed:

$$V^*_{de} \approx -(\omega^*_e)\sigma(I^*_{qe}) \quad (3)$$

where $\sigma$ is a lumped constant $$= \frac{L_s L_r - L_m^2}{L_r}$$

where $L_s$ is the inductance of the stator,
where $L_m$ is the magnetizing inductance, and
where $L_r$ is the inductance of the rotor.

The d-axis voltage command $V^*_{de}$ is then algebraically summed with the d-axis voltage feedback $V_{de}$ Fbk to produce an error or difference at summing junction 61. This error or difference is multiplied by $I^*_{qe}$ for proper sign as represented by multiplier block 62. The error is then applied as an input to a proportional-integral control loop in which block 63 represents the integral function 1/s, $K_{IS}$ is a constant multiplication factor for the integral, and block 64 represents multiplication by a proportional constant $K_{PS}$. The outputs from the proportional and integral branches are summed at junction 65 to complete the PI control loop and produce slip gain $K_s$. This multiplier is multiplied by $I^*_{qe}$ at multiplier block 66 to produce the stator operating frequency command $\omega_s$.

The last two operations can expressed in the following two mathematical equations:

$$K_s = K_{IS} \int [V^*_{de} - V_{de}Fbk]I^*_{qe} + \quad (4)$$

$$K_{PS}[V^*_{de} - V_{de}Fbk)]I^*_{qe}$$

$$\omega_s = K_s(I^*_{qe}) \quad (5)$$

Referring back to FIG. 4, it will be seen that the slip operating frequency command $\omega_s$ is summed with the rotor frequency feedback $\omega_r$ at summing junction 35 to generate the resulting stator operating frequency command $\omega^*_e$. This quantity is then fed back to the flux control loop 33 and the slip control loop 34.

One of the conditions of proper vector orientation is that the q-axis rotor flux should remain equal to zero according to the following expression:

$$\lambda_{qr} = 0 \quad (6)$$

Also the stator flux $\lambda_{qe}$ is a back-EMF factor that will subtract from the d-axis voltage according to the following approximation:

$$V_{de} \approx R_s I_{de} - (\omega_e)(\lambda_{qe}) \quad (7)$$

If q-axis rotor flux, $\lambda_{qr}$, becomes non-zero as base speed is exceeded, this will cause an increase in q-axis stator flux, $\lambda_{qe}$. This flux factor decreases the net feedback value $V_{de}$ Fbk for the d-axis voltage, which is an input to the slip control loop 33. Therefore, under these conditions, the slip operating frequency command $\omega_s$ is increased to maintain vector orientation.

Referring next to FIG. 6, the stator operating frequency command $\omega^*_e$ is an input to the flux control loop 33, and more specifically, to a function block 68, which represents the control of a d-axis voltage command $V^*_{qe}$ in response to $\omega^*_e$ according to the following approximations:

$$V^*_{qe} \approx R_s I_q + (\omega^*_e)(\lambda_{de}) \quad (8)$$

$$V^*_{qe} \approx (\omega^*_e)(\lambda_{de}) \quad (9)$$

where $R_s$ is the resistance of the stator, and
where $\lambda_{de}$ is the d-axis flux.

At $\omega^*_e = \omega_b$, the feedback voltage $V_{qe}$ Fbk is sampled, and this becomes the voltage command $V^*_{qe}$ for stator operating frequencies above base speed. Thus, the limit or flat part of the function in block 68 occurs at $\omega^*_e = \omega_b$. The sampling of the voltage feedback is continued as the motor is operated above base speed, and the voltage command $V^*_{qe}$ is algebraically summed with the voltage feedback $V_{qe}$ Fbk as represented by summing junction 69. This error is an input to a PI control loop with integral function ($K_{IF}/s$) block 70 and proportional function ($K_{PS}$) block 71. After these two functions are applied to the error the results are summed, as represented by summing junction 72 to produce the d-axis current command $I^*_{de}$. This becomes an input to the transformation block 28 in FIG. 4 as described above.

Equation (8) above shows that the q-axis voltage includes a component that is responsive to a d-axis flux component.

By holding the voltage command $V^*_{qe}$ constant, any increase in speed will increase the back-EMF factor, which in turn increases the actual q-axis voltage. This will cause an error in the q-axis voltage, which decreases the flux current command $I^*_{de}$ through the flux control loop in FIG. 6 and, in turn, weakens flux to hold voltage to the command value $V^*_{qe}$.

Thus, a motor control system is provided to respond to the cross-coupling of d-q parameters and to maintain vector control as speed in increased above base speed.

This description has been by way of example of how the invention can be carried out. Those with experience in the art will recognize that various details may be modified in arriving at other detailed embodiments, and that many of these embodiments will come within the scope of the invention. Therefore to apprise the public of the scope of the invention and the embodiments covered by the invention the following claims are made.

We claim:

1. A method for controlling slip in an induction motor having a stator and rotor, the method comprising:
   controlling stator voltage in response to a difference between commanded stator current and actual stator current, and in response to a stator operating frequency command;
   determining a rotor frequency that is responsive to the rotational speed of the rotor;
   determining the stator operating frequency command from the rotor frequency and a slip frequency command;
   generating a stator voltage command in response to a preset parameter;
   determining voltage feedback representative of actual stator voltage;
   determining a voltage error as a difference between the stator voltage command and the voltage feedback representative of actual stator voltage;
   applying a control function to the voltage error to generate a slip multiplier for torque-producing current;
   multiplying the slip multiplier by a command for torque-producing current to control the slip frequency command;
   changing the slip multiplier in response to the voltage error to control the slip frequency command; and
   algebraically summing the slip frequency command and the rotor frequency to control the stator operating frequency command.

2. The method of claim 1, wherein
   generating a stator voltage command includes generating a command for the d-axis component of stator voltage;
   wherein determining voltage feedback includes receiving voltage feedback representative of a d-axis component of actual stator voltage;
   wherein determining the voltage error includes determining a voltage error for d-axis voltage from a difference between the command for the d-axis component of stator voltage and the voltage feedback representative of the d-axis component of actual stator voltage; and
   wherein a proportional and integral control function is applied to the voltage error for the d-axis component of stator voltage to generate the slip multiplier.

3. The method of claim 2, wherein
   determining voltage feedback includes receiving voltage feedback representative of a q-axis component of actual stator voltage when the motor is operating at base speed and also includes receiving voltage feedback representative of a q-axis component of actual stator voltage when the motor is operated above base speed; and
   using the voltage feedback received for a q-axis component of actual stator voltage when the motor is operating at base speed as a command for the q-axis component of stator voltage for operating the motor above base speed; and
   controlling a command for flux-producing current to the stator in response to an error between the command for the q-axis component of stator voltage for operating the motor above base speed and the voltage feedback received for the q-axis component of actual stator voltage when the motor is operated above base speed.

4. The method of claim 1, wherein
   determining voltage feedback includes receiving voltage feedback representative of a q-axis component of actual stator voltage when the motor is operating at base speed and also includes receiving voltage feedback representative of a q-axis component of actual stator voltage when the motor is operated above base speed; and
   using the voltage feedback received for a q-axis component of actual stator voltage when the motor is operating at base speed as a command for the q-axis component of stator voltage for operating the motor above base speed; and
   controlling a command for flux-producing current to the stator in response to an error between the command for the q-axis component of stator voltage for operating the motor above base speed and the voltage feedback received for the q-axis component of actual stator voltage when the motor is operated above base speed.

5. The method of claim 4, wherein
   generating a stator voltage command includes generating a command for the d-axis component of stator voltage;
   wherein determining voltage feedback includes receiving voltage feedback representative of a d-axis component of actual stator voltage;
   wherein determining the voltage error includes determining a voltage error for d-axis voltage from a difference between the command for the d-axis component of stator voltage and the voltage feedback representative of the d-axis component of actual stator voltage; and
   wherein a proportional and integral control function is applied to the voltage error for the d-axis component of stator voltage to generate the slip multiplier.

6. The method of claim 1, wherein the slip frequency command to the current regulator is increased in response to voltage feedback greater than the stator voltage command.

7. A motor drive for controlling the slip of an induction motor without initial adjustment of the drive for the effects of motor parameters, the motor drive being of the type adapted for electrical connection to means coupled to the rotor to sense the frequency of the rotor, the motor drive comprising:
   a voltage inverter for generating voltages to be applied to the stator of an induction motor;
   means for controlling the voltage inverter with a stator operating frequency command and with stator current commands, and in response to feedback representative of actual stator current;

means for generating a stator voltage command in response to a user input;

means for determining voltage feedback representative of actual stator voltage; and means for determining a voltage error as a difference between the stator voltage command and the voltage feedback representative of actual stator voltage; and means for applying a control function to the voltage error to generate a slip multiplier for torque-producing current;

means for multiplying the slip multiplier by a command for torque-producing to control the slip frequency command;

means for changing the slip multiplier in response to the voltage error to control the slip frequency command; and means for algebraically summing the slip frequency command and the rotor frequency to control the stator operating frequency command.

8. The motor drive of claim 7, wherein the means for determining voltage feedback includes voltage feedback means for sensing AC voltage feedback responsive to the voltage being applied to the stator during operation of the motor;

wherein the means for determining voltage feedback includes means for converting the AC voltage feedback to a corresponding plurality of digital voltage feedback values;

wherein the means for determining a voltage error is operable below base speed for calculating a single DC value for voltage feedback in response to the plurality of digital voltage feedback values; and wherein the means for determining a voltage error determines the voltage error between the stator voltage command and the single DC value for voltage feedback.

9. The motor drive of claim 7, wherein:

the means for determining voltage feedback includes means for sensing AC voltage feedback responsive to the voltage being applied to the stator during operation of the motor;

wherein the means for determining voltage feedback includes conversion means for converting the AC voltage feedback to a corresponding plurality of digital voltage feedback values;

wherein the means for determining a voltage error includes means for calculating DC values for q-axis voltage feedback and d-axis voltage feedback which vary 90° in phase;

wherein the means for determining a voltage error includes means for resolving the stator voltage command into DC commands for the q-axis and d-axis, respectively; and wherein the means for determining a voltage error includes means for establishing the DC value for the d-axis voltage feedback when the motor is operating at base speed as a reference DC command for the d-axis voltage when the motor is operating above base speed;

wherein the means for determining a voltage error includes means for controlling the slip multiplier in response to the difference between the DC value for the d-axis voltage feedback and the reference DC command for the d-axis.

* * * * *